United States Patent [19]

Chrysostome et al.

[11] Patent Number: 4,674,564
[45] Date of Patent: Jun. 23, 1987

[54] FLUIDIZING APPARATUS WITH BUILT-IN HEAT EXCHANGER

[75] Inventors: Gérard Chrysostome, Montchanin; Alain Feugier, Morainvilliers; Jean C. Kita, Forbach, all of France

[73] Assignee: Charbonnages De France, Paris, France

[21] Appl. No.: 854,077

[22] Filed: Apr. 17, 1986

Related U.S. Application Data

[63] Continuation of Ser. No. 597,824, Apr. 6, 1984, abandoned.

[30] Foreign Application Priority Data

Apr. 7, 1983 [FR] France ............................ 83 05689

[51] Int. Cl.⁴ ............................................. F28C 3/16
[52] U.S. Cl. ................................ 165/104.16; 165/96; 34/57 A; 422/146
[58] Field of Search ............................ 165/104.16, 96; 34/57 A; 422/146, 143

[56] References Cited

U.S. PATENT DOCUMENTS

| | | | |
|---|---|---|---|
| 3,908,284 | 9/1975 | Beranek et al. | 165/104.16 |
| 4,135,889 | 1/1979 | Mori | 34/57 A |
| 4,313,398 | 2/1982 | Ostendorf | 165/104.16 |

FOREIGN PATENT DOCUMENTS

| | | | |
|---|---|---|---|
| 2152401 | 4/1972 | Fed. Rep. of Germany | 165/104.16 |
| 99334 | 7/1980 | Japan | 422/143 |

Primary Examiner—Albert W. Davis, Jr.
Attorney, Agent, or Firm—Cushman, Darby & Cushman

[57] ABSTRACT

Fluidizing apparatus comprises a grid defining cavities and main fluidizing gas blower channels connected to these cavities. Complementary channels pass through openings in swellings at the intersections of the cavities. Their upper ends are above the level of the grid. They are adapted to blow a complementary gas into an active area disposed above each swelling. A heat exchanger is adapted to exchange heat with the fluidized bed. It comprises at least one tube shaped so as to extend over the grid and through a plurality of these active areas. The rate of heat exchange may be modified by altering the complementary gas flowrate, without modifying the fluidization velocity.

3 Claims, 4 Drawing Figures

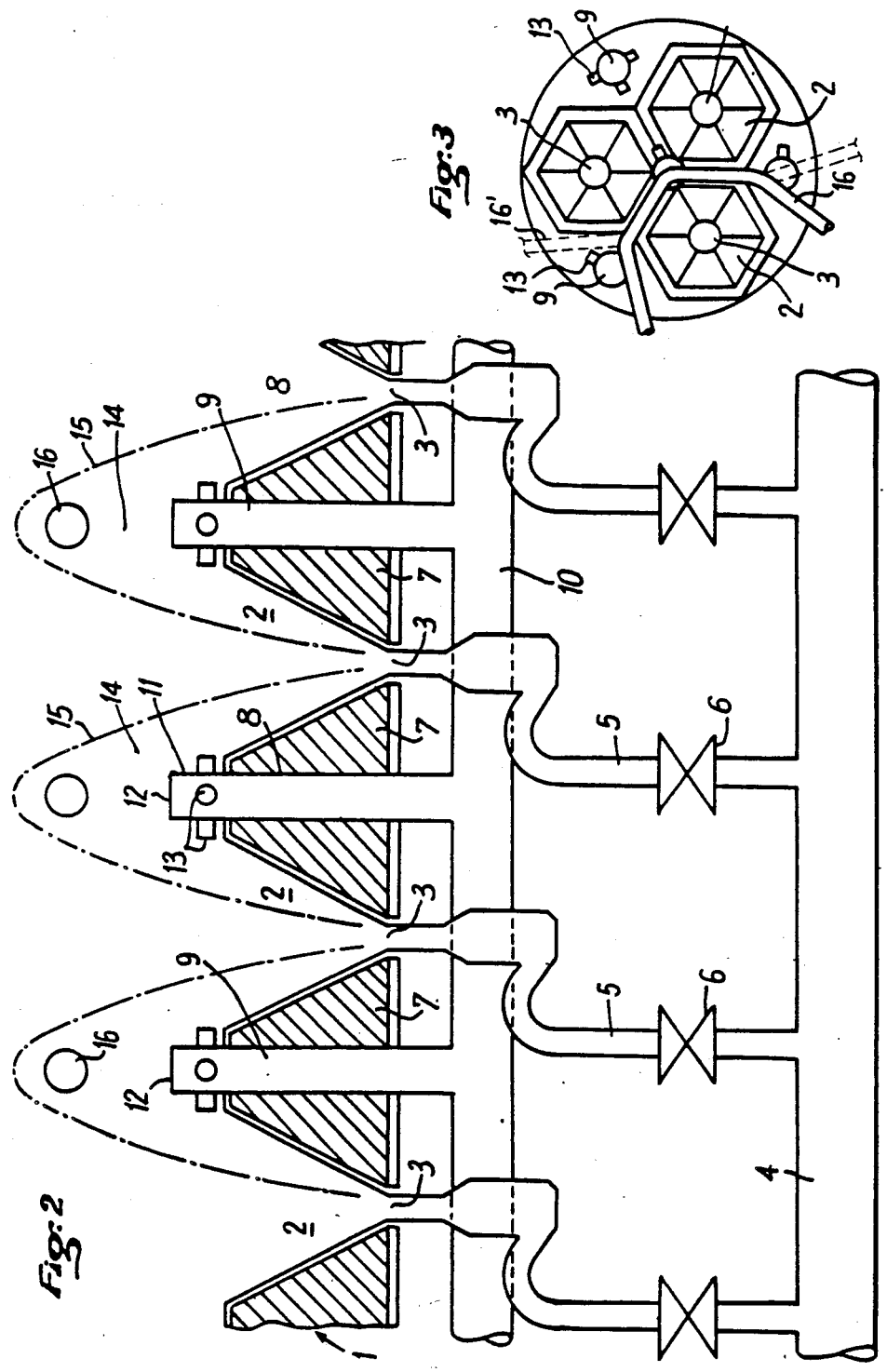

FLUIDIZING APPARATUS WITH BUILT-IN HEAT EXCHANGER

This is a continuation of application Ser. No. 597,824, filed Apr. 6, 1984, which was abandoned upon the filing hereof.

BACKGROUND OF THE INVENTION

1. Field of the Invention

The object of the invention is fluidizing apparatus comprising a built-in heat exchanger adapted to exchange heat with the fluidized bed.

2. Description of the Prior Art

Generally speaking, such heat exchange is in the direction to remove heat energy from the fluidized bed, especially when the latter is produced in a furnace designed to burn fluidized coal. Obtaining combustion in a fluidized bed is dependent on control of the temperature within the bed.

It is known to place heat exchanger tubes within a fluidized bed. Their heat exchange coefficient is varied by placing them in an area where the level of the bed may be varied and by arranging things so that the bed is at different levels, which is achieved by appropriate variation in the velocity of the fluidizing gas. By modifying the depth of the fluidized bed, the exchanger tubes are immersed in it to varying degrees. The exchange coefficient is much higher within the bed (300 W/m²/°C., for example) than outside the bed (20 W/m²/°C., for example). Significant variation in the level of the bed, in particular through modifying the flowrate of the fluidizing gas, introduces difficulties and in particular results in a significant variation of the head loss by the fluidizing gas distribution grid, whence the risk of inadequate fluidization of the charge.

SUMMARY OF THE INVENTION

The invention consists in fluidizing apparatus means adapted to produce a fluidized bed, including a grid defining cavities, main fluidizing gas blower channels connected to said cavities, swellings at the intersections of said cavities, openings in said swellings, and complementary channels passing through said openings and having upper ends disposed above the level of said grid and being adapted to blow a complementary gas into an active area disposed above each swelling, and further comprising a heat exchanger adapted to exchange heat with said fluidized bed, and at least one tube in said heat exchanger shaped to extend over said grid and through a plurality of said active areas.

The invention results from the observation that it is possible to modify as necessary the exchange coefficient of an exchanger disposed within a fluidized bed, without having to operate on the depth of the latter, when using fluidizing apparatus containing complementary gas injection channels disposed between the main fluidizing gas channels, provided that the exchanger tubes run above the complementary channels, within the active area of the latter.

In this context, the active area is that region of space within which the effect of the injection of gas by the complementary channels produces a modification of the fluidization state within the fluidized bed previously established by the fluidizing gas from the main channels. This area varies in size according to the size of the apparatus and the conditions of utilization.

Nevertheless, it may be stated that the active area of the complementary channels begins at a small distance from their summit and that, in accordance with the invention, the exchanger tubes may be typically disposed at a distance of a few centimeters from the complementary channels, between one centimeter and several centimeters, for example. In apparatus where the active area of the complementary channels is larger, the invention offers the possibility of disposing a number of tubes at different levels within this area, the first of these tubes being disposed at the distance just indicated.

Fluidizing apparatus of the kind mentioned hereinabove is described in French Pat. No. 82 00815 of Jan. 20, 1982. In this patent there is no description of any heat exchanger placed within the fluidized bed. The complementary channels are here intended only to provide for rapid and large modifications to the rate of combustion within the bed, by changing the velocity of the combustion-supporting gas between 1 and 6.1 m/s.

In accordance with the present invention, there is no question of such large variations in the gas velocity. To the contrary, with an exchanger in the active area of the secondary channels, a significant variation in the exchange coefficient is obtained at much lower velocities of the gas, as will be shown hereinafter.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 2 is a partial view to a larger scale in cross-section on the broken line II—II in FIG. 1, showing main and complementary channels of the grid of FIG. 1 with a heat exchanger disposed in accordance with the invention.

FIG. 3 is a partial plan view of the grid from FIG. 2.

DESCRIPTION OF THE PREFERRED EMBODIMENT

Figure 1:
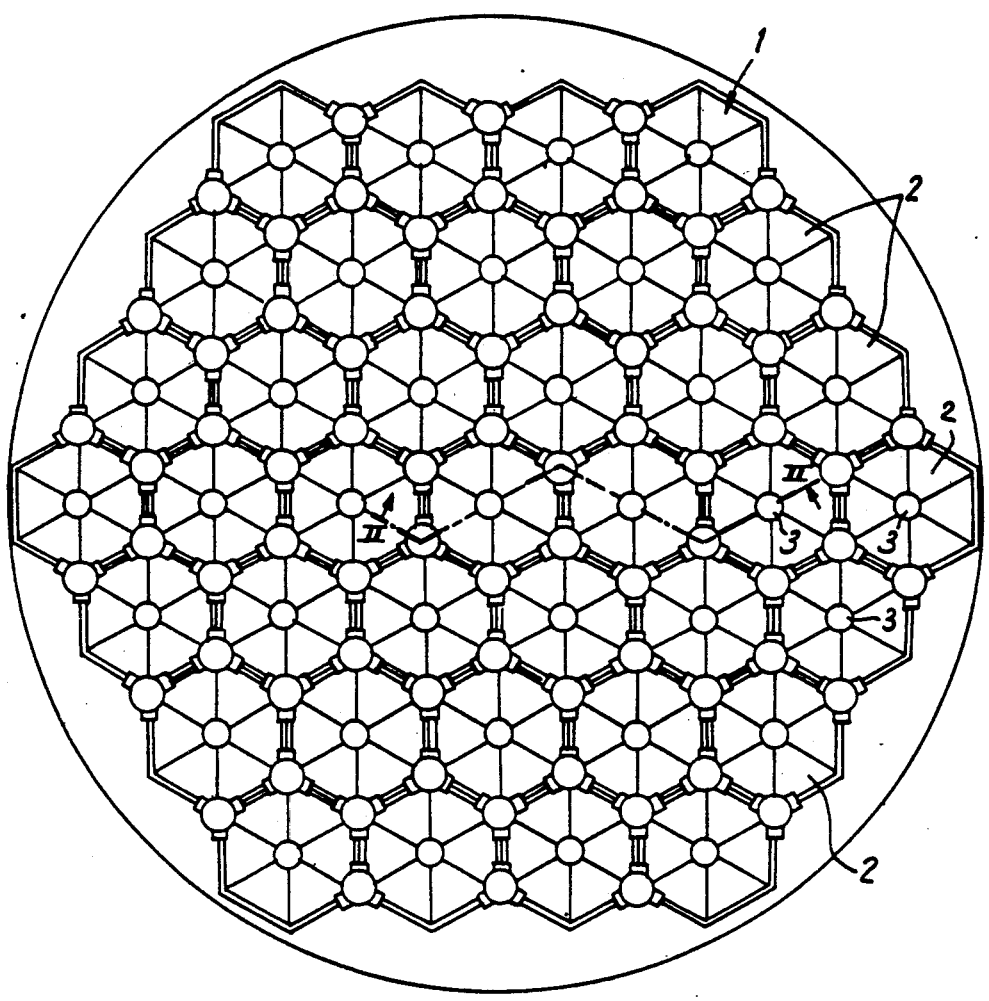
FIG. 1 is a plan view of a combustion grid comprising main and complementary air blower channels.

The fluidizing apparatus described herein by way example is a combustion hearth of a furnace burning fuel in fluidized form. The present invention concerns only the grid and thus only this will be described.

The grid 1 is made of a cast or welded appropriate metal or refractory material so as to feature cavities 2 which have a frustoconical or pyramid-shaped profile widening from the bottom towards the top within the thickness of the grid when the latter is disposed horizontally, in the usual manner. At its lower end each cavity 2 has an opening 3 which is connected to a main conduit 4 for distributing gases via channels 5, referred to hereinafter as the main channels, in each of which is disposed a valve 6.

At each of the intersections of the cavities 2, the material of which the grid 1 is made forms a swelling 7 through which passes a vertical opening 8. In each of these openings 8 there is inserted a complementary channel 9 which starts from a complementary gas distribution conduit 10 beneath the grid 1 and extends above the grid 1 to terminate in an upper end portion 11. This is closed off at 12 at its upwards facing end and has one or more lateral openings 13.

The blowing of combustion-supporting air through the main channels 5 fluidizes the combustible material above the grid 1. There then exist within the fluidized bed, above each swelling 7 and each complementary channel 9, areas of very low agitation. Each of these areas is delimited by a substantially parabola-shaped contour indicated in chain-dotted line 15.

In practice, there is no such clearly delimited boundary between the fluidized bed and the area 14 of low agitation surmounting each swelling 7. The size of this area varies according to the size of the swellings 7 and the velocity of the gas blown in through the main channels 5. In all cases, this area 14 exists and is located above the complementary channels 9. Consequently, any gas blown in through these complementary channels 9 modifies the state of the material within the areas 14. This change tends to create increasingly large agitation in these areas 14 up to the point at which the velocity of the gas blown in through the complementary channels 9 becomes sufficiently great for a homogeneous fluidized bed to be established above the grid 1.

The areas 14 defined above are thus also the active areas of the complementary channels 9, that is to say the areas in which the air blown through the latter increases the agitation of the parts of the bed which were less actively agitated by the gas blown in through the main channels 5.

It is particularly advantageous to dispose at least one heat exchanger tube 16 in the areas 14, shaping it so as to pass successively above a plurality of complementary channels 9, as shown in FIG. 3.

In one small-scale embodiment of a grid 1 associated with a heat exchanger, in conformity with the invention, the exchanger had only one tube 16 which was placed 1 cm above the summit 12 of the complementary channels 9. In a large industrial reactor, the areas 14 could be of larger dimensions by virtue of the larger size of the pyramids; the tube 16 could be placed higher. Also, it would then become possible to superpose within the areas 14 a plurality of heat exchanger tubes as shown at 16.

When the complementary channels 9 are not in service the heat exchanger tube(s) 16 is/are buried within a mass of relatively weakly agitated material in the areas 14. The quantity of heat taken off by the tubes 16 is low.

When the complementary channels 9 are fed with gas at a progressively increasing flowrate, the quantity of heat evacuated becomes higher as the agitation in the areas 14 increases.

In this way it is possible to modulate the quantity of heat extracted without varying the depth of the fluidized bed, by controlling the flowrate of the gas blown in through the complementary channels 9.

Fluidizing apparatus with a built-in heat exchanger in accordance with the invention provides for great flexibility in operation. It is possible to change from a reduced rate of operation (by blowing through the main channels 5 only) to a maximum rate of operation (by blowing through the main channels 5 and the complementary channels 9), at the same time increasing the rate of heat transfer by the exchanger, by simply switching into service the complementary channels 9.

The apparatus in accordance with the invention also provides a simple means of regulating the combustion temperature within the fluidized bed. If the temperature of the latter falls, by reducing the rate of flow of air through the complementary channels 9 it is possible to reduce the heat transfer coefficient of the exchanger. At the same time the excess air ratio is reduced, favoring an increase in the temperature.

Also, as the tubes 16 are placed in the areas 14 in which the agitation of the bed is less pronounced, as explained hereinabove, the extent to which they are worn by mechanical friction is reduced.

Figure 4:
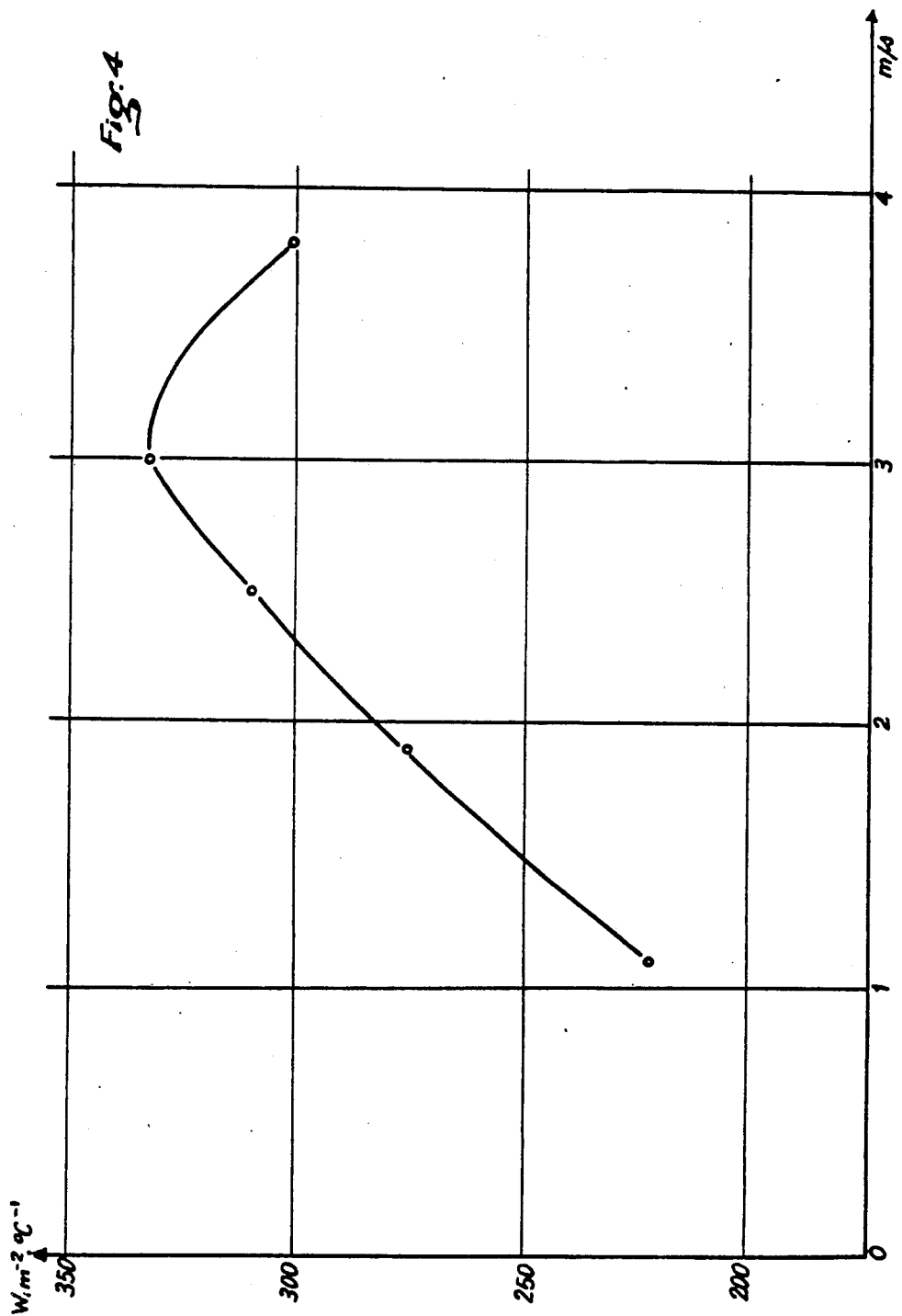
FIG. 4 is a graph.

FIG. 4 is a graph showing the variation in the overall exchange coefficient plotted along the ordinates in W/m$^2$/°C. as a function of the fluidization velocity plotted along the abscissae in m/s, with a grid 1 and a tube 16 placed 1 cm above the complementary channels 9.

The coal used was specified as follows:

Particle size

<10 mm: 95.4%
<3.15 mm: 68.9%
<1 mm: 36.6%
<0.5 mm: 19.6%
Moisture content: 6.6%
Ash content: 54.6%
Volatile materials: 20.4%
Net C.V.: 15 600 kJ/kg sec The operating conditions were as follows:
fluidized bed temperature: 950° C.,
bed head loss: 400 mm head of water (40 mb approx).

The total flowrate of fluidizing air was adjusted to various values between 145 and 265 m$^3$/h, producing fluidization velocities between 1.1 and 3.8 m/s.

At velocities below 2 m/s the air was blown in through the main channels 5 at a flowrate such as to progressively increase the velocity from 1.1 to 2 m/s. Only a minimum quantity of air was blown in through the complementary channels, for technical reasons.

At speeds above 2 m/s, starting from this value, the flowrate of air in through the main channels 5 was maintained constant and the flowrate of complementary air blown through the complementary channels 9 was progressively increased to 3.8 m/s.

In the range investigated (from 1.1 to 3.8 m/s), the test showed that it was possible to vary the overall exchange coefficient of the tube 16 by modifying the air flowrate.

It was observed that the overall exchange coefficient showed a maximum (K=334 W/m$^2$/°C.) when the complementary air flowrate represented 40% of the total fluidizing air flowrate and the fluidizing velocity was 3 m/s.

The coefficient fell for higher values of the velocity because of an excessively high velocity in the vicinity of the tube 16 (poor contact between solids and tube, and cold air impinging on the tube).

In practice, for operation of the installation at its nominal rating, the thermal transfer coefficient of the tube 16 is maximized by optimizing the ratio of the complementary air to the total fluidizing air.

As has already been explained, in apparatus in accordance with the invention but of different dimensions, it is possible for the exchange coefficient variation curve to have a shape different to that shown in FIG. 4.

What remains constant, in accordance with the invention, is the fact that the complementary channels 9 have an active area within which it is advantageous to dispose one or more heat exchanger tubes so as to be able to modify the conditions of heat exchange with the fluidized bed, operating in particular on the flowrate of the gas blown in through the complementary channels.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. Fluidizing apparatus comprising:
    a grid having a plurality of cavities generally all at the same level,
    a main conduit for fluidizing gas and a first set of channels connected to said main conduit and to said cavities respectively, so that the gas will be discharged substantially vertically in a selected pattern from said cavities,
    a plurality of openings through said grid between said cavities,
    a complementary gas distribution conduit separate from said main conduit,
    a second set of channels connected to said complementary gas distribution conduit and connected to said openings, said openings each terminating in an upper end portion above said level of said grid to blow a complementary gas substantially laterally into said selected pattern,
    a heat exchanger having at least one tube positioned to extend over said grid and through portions of said selected pattern substantially above each said upper end portion.

2. Apparatus according to claim 1, wherein said at least one tube is spaced from said grid by a distance between one and several centimeters.

3. Apparatus according to claim 1, wherein said at least one tube is one of a plurality of such tubes disposed one above the other within said active areas.

* * * * *